United States Patent
Chittimalli et al.

(10) Patent No.: US 9,652,227 B2
(45) Date of Patent: May 16, 2017

(54) ASSIGNING AN ANNOTATION TO A VARIABLE AND A STATEMENT IN A SOURCE CODE OF A SOFTWARE APPLICATION

(71) Applicant: Tata Consultancy Services Limited, Mumbai, Maharashtra (IN)

(72) Inventors: Pavan Kumar Chittimalli, Pune (IN); Ravindra Dinkar Naik, Pune (IN)

(73) Assignee: Tata Consultancy Services Limited, Mumbai (IN)

( * ) Notice: Subject to any disclaimer, the term of this patent is extended or adjusted under 35 U.S.C. 154(b) by 182 days.

(21) Appl. No.: 14/726,326

(22) Filed: May 29, 2015

(65) Prior Publication Data

US 2015/0347129 A1 Dec. 3, 2015

(30) Foreign Application Priority Data

Jun. 2, 2014 (IN) .......................... 1823/MUM/2014

(51) Int. Cl.
*G06F 9/44* (2006.01)
*G06F 9/45* (2006.01)

(52) U.S. Cl.
CPC ................ *G06F 8/73* (2013.01); *G06F 8/427* (2013.01); *G06F 8/75* (2013.01)

(58) Field of Classification Search
None
See application file for complete search history.

(56) References Cited

U.S. PATENT DOCUMENTS

| | | | |
|---|---|---|---|
| 7,240,332 B2 | 7/2007 | Berg et al. | |
| 7,539,753 B2 | 5/2009 | Amini et al. | |
| 7,610,545 B2 | 10/2009 | Horen et al. | |
| 8,595,042 B2 | 11/2013 | Adler et al. | |

(Continued)

OTHER PUBLICATIONS

Sridhara et al., "Towards Automatically Generating Summary Comments for Java Methods", Proceedings of the IEEE/ACM international conference on Automated Software Engineering (ASE '10), Sep. 20-24, 2010, pp. 43-52.*

(Continued)

*Primary Examiner* — H S Sough
*Assistant Examiner* — Timothy Duncan
(74) *Attorney, Agent, or Firm* — Knobbe Martens Olson & Bear LLP

(57) ABSTRACT

A method and system for assigning an annotation to a statement in a source code. The method comprises generating intermediate representation of the source code by parsing the source code. The method comprises identifying one or more instances of definition of a variable and one or more instances of use of the variable. The method comprises categorizing the variable into a group of variables based on the one or more instances of definition of the variable, the one or more instances of use of the variable, a description of the variable, and mathematical operators defining a correlation between the variable and one or more other variables. Further, a data description table and a data dictionary of the plurality of variables are created. The method assigns an annotation to the variable present in the statement of the source code based on the data description table and the data dictionary.

20 Claims, 3 Drawing Sheets

(56) References Cited

U.S. PATENT DOCUMENTS

2008/0109471 A1\* 5/2008 Subbian .............. G06F 11/3604
2012/0311535 A1\* 12/2012 Fanning .............. G06F 11/3604
717/123

OTHER PUBLICATIONS

Sridhara et al., "Automatically Detecting and Describing High Level Actions within Methods", 33rd International Conference on Software Engineering (ICSE), May 21-28, 2011.\*
Erickson, "An Automated Fortran Documenter", Proceedings of the 1st Annual International Conference on System Documentation (SIGDOC '82), Jan. 22-23, 1982, pp. 40-45.\*
SRI International; "SPADE: Support for Provenance Auditing in Distributed Environments" 13th ACM/IFIP/USENIX International Conference on Middleware, 2012.
Eleni Gessiou, Vasilis Pappas, Elias Athanasopoulos, Angelos D. Keromytis, and Sotiris Ioannidis; "Towards a Universal Data Provenance Framework using Dynamic Instrumentation" IFIP Advances in Information and Communication Technology vol. 376, 2012, pp. 103-114.

\* cited by examiner

ASSIGNING AN ANNOTATION TO A VARIABLE AND A STATEMENT IN A SOURCE CODE OF A SOFTWARE APPLICATION

CROSS REFERENCE TO RELATED APPLICATIONS

This application claims the benefit of Indian Application No. 1823/MUM/2014, filed Jun. 2, 2014, and titled "ASSIGNING AN ANNOTATION TO A VARIABLE AND A STATEMENT IN A SOURCE CODE OF A SOFTWARE APPLICATION," and assigned to the assignee hereof. The disclosure of this prior application is considered part of this application, and is hereby incorporated by reference in its entirety.

TECHNICAL FIELD

The present subject matter described herein, in general, relates to annotating a source code, and more particularly to assigning an annotation to a variable and a statement in the source code of a software application.

BACKGROUND

The modern software systems/applications use massive data persistently in the source code. The persistent use of the massive data leads to a complex flow of data. The data may flow from the database, screens, or through a plurality of software processes in the source code. The data may also undergo transformation at multiple points in the source code, giving rise to additional data. The data may be further stored in a database or displayed to the user after undergoing the transformation.

In order to analyze and understand provenance of the data it is necessary to understand the flow of data in the source code. The flow of data may be analyzed by examining transformation or modification in the data at every step of the source code. The conventional methods fail to provide detailed information for the analysis of the flow of data in the source code. Further, the conventional methods may be prone to substantial errors and may become unmanageable due to numerous control flow paths and data flow paths in the source code.

SUMMARY

This summary is provided to introduce aspects related to systems and methods for assigning an annotation to a statement in a source code of a software application and the aspects are further described below in the detailed description. This summary is not intended to identify essential features of the claimed subject matter nor is it intended for use in determining or limiting the scope of the claimed subject matter.

In one implementation, a method for assigning an annotation to a variable and a statement in a source code of a software application is disclosed. The method comprises generating, by a processor, an intermediate representation of the source code by parsing the source code. The source code comprises a plurality of variables. The method further comprises identifying one or more instances of definition of a variable of the plurality of variables present in the intermediate representation. The method also identifies one or more instances of use of the variable in the intermediate representation. Further, the method comprises categorizing, by the processor, the variable into a group of variables based on the one or more instances of definition of the variable, the one or more instances of use of the variable, a description of the variable, and mathematical operators defining a correlation between the variable and one or more other variables of the plurality of variables. The description of the variable indicates a nature of data stored in the variable. The group of variables comprises variables storing data of similar nature. The method further comprises creating a data description table of the plurality of variables. The data description table comprises the variable and the description of the variable. The method further comprises creating, by the processor, a data dictionary of the plurality of variables. The data dictionary comprises the group of variables and the description of the variables present in the group of variables. The method comprises assigning, by the processor, an annotation to the variable present in the statement of the source code based on the data description table and the data dictionary, thereby assigning the annotation to the statement in the source code of the software application.

In one implementation, a system for assigning an annotation to a variable and a statement in a source code of a software application is disclosed. The system comprises a processor and a memory coupled to the processor for executing a plurality of modules present in the memory. The plurality of modules comprises a generating module, an identifying module, a categorizing module, a creating module, and an assigning module. The generating module generates an intermediate representation of the source code by parsing the source code. The source code comprises a plurality of variables. The identifying module identifies one or more instances of definition of a variable of the plurality of variables present in the intermediate representation and one or more instances of use of the variable in the intermediate representation. The categorizing module categorizes the variable into a group of variables based on the one or more instances of definition of the variable, the one or more instances of use of the variable, a description of the variable, and mathematical operators defining a correlation between the variable and one or more other variables of the plurality of variables. The description of the variable indicates a nature of data stored in the variable. The group of variables comprises variables storing data of similar nature. The creating module creates a data description table of the plurality of variables. The data description table comprises the variable and the description of the variable. The creating module also creates a data dictionary of the plurality of variables. The data dictionary comprises the group of variables and the description of the variables present in the group of variables. The assigning module assigns an annotation to the variable present in the statement of the source code based on the data description table and the data dictionary, thereby assigning the annotation to the statement in the source code of the software application.

In one implementation, a non-transitory computer readable medium embodying a program executable in a computing device for assigning an annotation to a variable and a statement in a source code of a software application is disclosed. The program comprises a program code for generating an intermediate representation of the source code by parsing the source code. The source code comprises a plurality of variables. The program comprises a program code for identifying one or more instances of definition of a variable of the plurality of variables present in the intermediate representation. The program further comprises a program code for identifying one or more instances of use of the variable in the intermediate representation. The program also comprises a program code for categorizing the variable into a group of variables based on the one or more instances of definition of the variable, the one or more instances of use of the variable, a description of the variable, and mathematical operators defining a correlation between the variable and one or more other variables of the plurality of variables. The description of the variable indicates a nature of data stored in the variable. The group of variables comprises variables storing data of similar nature. The program further comprises a program code for creating a data description table of the plurality of variables. The data description table comprises the variable and the description of the variable. The program also comprises a program code for creating a data dictionary of the plurality of variables. The data dictionary comprises the group of variables and the description of the variables present in the group of variables. The program comprises a program code for assigning an annotation to the variable present in the statement of the source code based on the data description table and the data dictionary, thereby assigning the annotation to the statement in the source code of the software application.

BRIEF DESCRIPTION OF THE DRAWINGS

The detailed description is described with reference to the accompanying figures. In the figures, the left-most digit(s) of a reference number identifies the figure in which the reference number first appears. The same numbers are used throughout the drawings to refer like features and components.

DETAILED DESCRIPTION

Systems and methods for assigning an annotation to a variable and a statement in a source code of a software application are described. The present subject matter discloses a mechanism for assigning the annotation to the variable and the statement in the source code of the software application. In order to assign the annotation to the variable and the statement in the source code, an intermediate representation of the source code may be generated by parsing the source code. The source code may comprise a plurality of variables.

The intermediate representation of the source code may be subjected to static analysis in order to identify one or more instances of definition of a variable of the plurality of variables. Further, the one or more instances of definition of the variable may be linked to one or more instances of use of the variable. Moreover, the one or more instances of use of the variable may also be linked to the one or more instances of definition of one or more other variables by performing static analysis on the intermediate representation of the source code.

The variable of the plurality of the variables may be categorized into a group of variables. The variable may be categorized into a group based on the one or more instances of definition of the variable, the one or more instances of use of the variable, a description of the variable, and mathematical operators defining a correlation between the variable and one or more other variables of the plurality of variables. The description of the variable indicates a nature of data stored in the variable. The group of variables comprises variables storing data of similar nature.

In order to annotate the statement, a data description table of the plurality of variables and a data dictionary of the plurality of variables may be created. The data description table may comprise the variable and the description of the variable. The data dictionary may comprise the group of variables and the description of the variables present in the group of variables. The data description table and the data dictionary may be used to assign an annotation to the variable present in the statement of the source code. The annotation assigned to each variable present in the statement of the source code may result in assigning the annotation to the variable and the statement in the source code.

While aspects of described system and method for assigning an annotation to a statement in a source code of a software application may be implemented in any number of different computing systems, environments, and/or configurations, the embodiments are described in the context of the following exemplary system.

Figure 1:
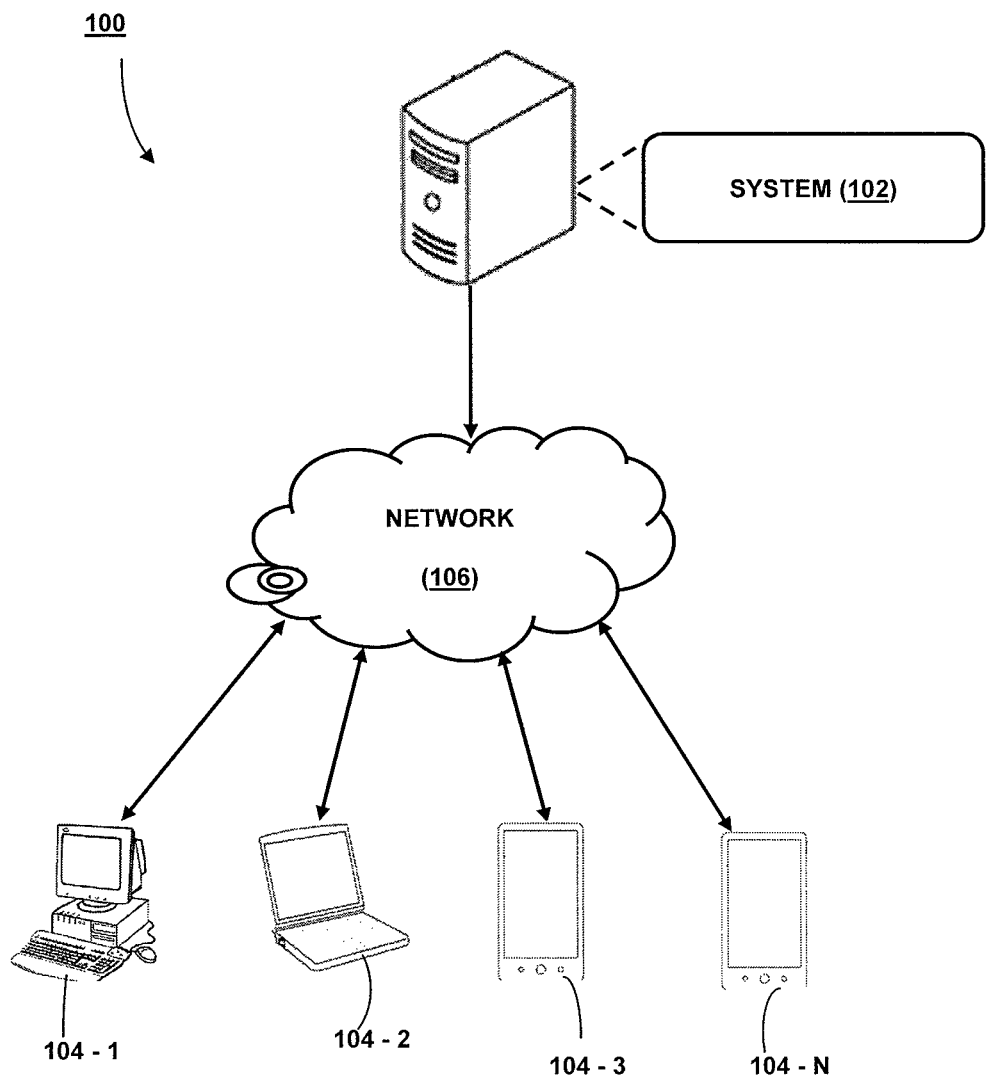
FIG. 1 illustrates a network implementation of a system for assigning an annotation to a variable and a statement in a source code of a software application, in accordance with an embodiment of the present subject matter.

Referring now to FIG. 1, a network implementation 100 of a system 102 for assigning an annotation to a variable and a statement in a source code of a software application is illustrated, in accordance with an embodiment of the present subject matter. In one embodiment, the system 102 may assign the annotation to the variable and the statement in the source code of the software application.

Although the present subject matter is explained considering that the system 102 is implemented on a server, it may be understood that the system 102 may also be implemented in a variety of computing systems, such as a laptop computer, a desktop computer, a notebook, a workstation, a mainframe computer, a server, a network server, and the like. In one implementation, the system 102 may be implemented in a cloud-based environment. It will be understood that the system 102 may be accessed by multiple users through one or more user devices 104-1, 104-2 . . . 104-N, collectively referred to as user devices 104 hereinafter, or applications residing on the user devices 104. Examples of the user devices 104 may include, but are not limited to, a portable computer, a personal digital assistant, a handheld device, and a workstation. The user devices 104 are communicatively coupled to the system 102 through a network 106.

In one implementation, the network 106 may be a wireless network, a wired network or a combination thereof. The network 106 can be implemented as one of the different types of networks, such as intranet, local area network (LAN), wide area network (WAN), the internet, and the like. The network 106 may either be a dedicated network or a shared network. The shared network represents an association of the different types of networks that use a variety of protocols, for example, Hypertext Transfer Protocol (HTTP), Transmission Control Protocol/Internet Protocol (TCP/IP), Wireless Application Protocol (WAP), and the like, to communicate with one another. Further the network 106 may include a variety of network devices, including routers, bridges, servers, computing devices, storage devices, and the like.

Figure 2:
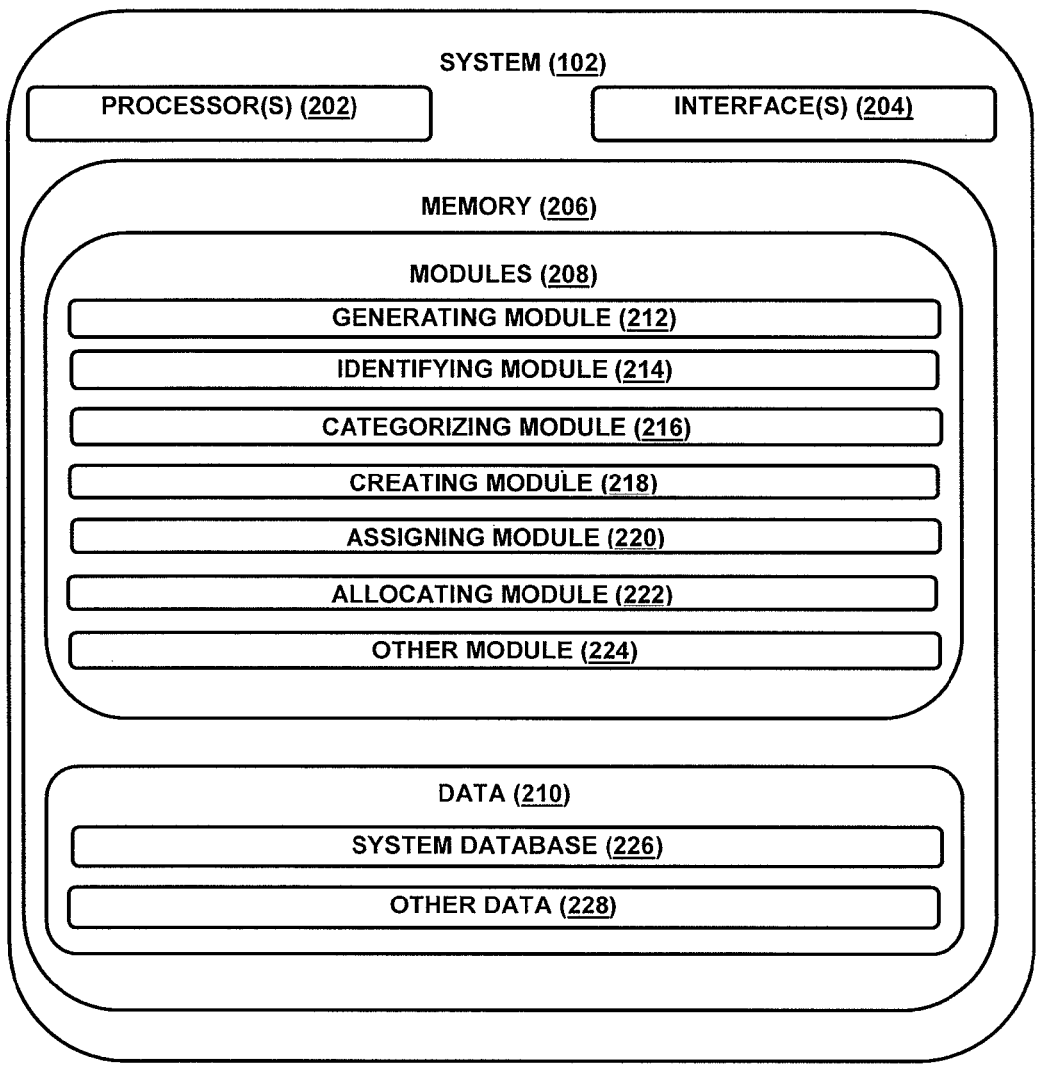
FIG. 2 illustrates the system, in accordance with an embodiment of the present subject matter.

Referring now to FIG. 2, the system 102 is illustrated in accordance with an embodiment of the present subject matter. In one embodiment, the system 102 may include at least one processor 202, an input/output (I/O) interface 204, and a memory 206. The at least one processor 202 may be implemented as one or more microprocessors, microcomputers, microcontrollers, digital signal processors, central processing units, state machines, logic circuitries, and/or any devices that manipulate signals based on operational instructions. Among other capabilities, the at least one processor 202 is configured to fetch and execute computer-readable instructions stored in the memory 206.

The I/O interface 204 may include a variety of software and hardware interfaces, for example, a web interface, a graphical user interface, and the like. The I/O interface 204 may allow the system 102 to interact with a user directly or through the client devices 104. Further, the I/O interface 204 may enable the system 102 to communicate with other computing devices, such as web servers and external data servers (not shown). The I/O interface 204 can facilitate multiple communications within a wide variety of networks and protocol types, including wired networks, for example, LAN, cable, etc., and wireless networks, such as WLAN, cellular, or satellite. The I/O interface 204 may include one or more ports for connecting a number of devices to one another or to another server.

The memory 206 may include any computer-readable medium known in the art including, for example, volatile memory, such as static random access memory (SRAM) and dynamic random access memory (DRAM), and/or non-volatile memory, such as read only memory (ROM), erasable programmable ROM, flash memories, hard disks, optical disks, and magnetic tapes. The memory 206 may include modules 208 and data 210.

The modules 208 include routines, programs, objects, components, data structures, etc., which perform particular tasks, functions or implement particular abstract data types. In one implementation, the modules 208 may include a generating module 212, an identifying module 214, a categorizing module 216, a creating module 218, an assigning module 220, an allocating module 222 and other modules 224. The other modules 224 may include programs or coded instructions that supplement applications and functions of the system 102.

The data 210, amongst other things, serves as a repository for storing data processed, received, and generated by one or more of the modules 208. The data 210 may also include a system database 226, and other data 228. The other data 228 may include data generated as a result of the execution of one or more modules in the other modules 224.

In one implementation, at first, a user may use the client device 104 to access the system 102 via the I/O interface 204. Alternatively, the system 102 may be accessed by a user directly with the help of the I/O interface 204. The user may register themselves using the I/O interface 204 in order to use the system 102. The working of the system 102 may be explained below. The system 102 may be used for assigning an annotation to a variable and a statement in a source code of a software application. The statement in the source code may be understood as a code syntax or a code command consuming a line in the source code, wherein the source code may have thousands of such lines/statements. The source code of the software application may comprise a plurality of variables, statements and the like. The statements may also comprise variables, expressions and the like. The annotation assigned to the variable and the statement in the source code may be a description in a natural language. The annotation assigned to the variable and the statement in the source code may define a relation between the variables present in the statement.

For example, consider that the statement in the source code may be 'x>y'. For the statement 'x>y', the annotation assigned may be based on a description of data stored in a variable x, and a description of data stored in a variable y. Therefore, consider that the description of the variable 'x' is 'amount', and the description of the variable 'y' is 'amount of transaction.' The annotation assigned to the statement 'x>y' may be—'amount is greater than the amount of transaction.'

In order to assign such annotations to the variables and the statements in the source code, at first, the system 102 may employ the generating module 212. The generating module 212 may generate an intermediate representation of the source code. The intermediate representation of the source code may be generated by parsing the source code. The intermediate representation of the source code may comprise a parse tree and a binary tree. The intermediate representation of the source code may have a plurality of variables. The plurality of variables may either be defined in source code or their definition may be imported from an external file or source.

After generating the intermediate representation of the source code, the system 102 may further employ the allocating module 222 for allocating a unique identifier to each variable of the plurality of variables. The unique identifier may be assigned to each definition point of the variable and to each use point of the variable in the source code. The unique identifier may be assigned based on a program point in the source code. For example, consider that a definition point for a variable 'a' may be, 'int a=0'. This definition point may be assigned an unique identifier '1' (unique-id: 1). The definition point in the source code may be further represented as, 'int a=0=><def, variable: a, unique-id: 1>'. Similarly, a use point of the variable 'a' may be assigned a different unique identifier. For the use point 'c=a+b' of the variable 'a' may have a unique identifier '5.' The use point of the variable may be represented as, 'c=a+b=><use, variable: a, unique-id: 5>.'

After generating the intermediate representation of the source code, the system 102 may also employ the identifying module 214 for identifying one or more instances of definition of a variable of the plurality of variables present in the intermediate representation of the source code. For example, the one or more instances of definition of a variable 'x' may be:
int x=10, (here x is defined with a value 10)
x=y, (here x is defined with a value of y)
x=a+b, (here x is defined with a value equal to a summation of a and b)

Further, the one or more instances of definition of the variable present in the source code may be extracted from external data source or file. For example, the one or more instances of definition of the variable 'X' and the variable 'Y' may be, 'READ X, Y from a File f1'.

The identifying module 214 may also identify one or more instances of use of the variable in the intermediate representation of the source code. For example, the one or more instances of use of the variable 'x' may be,
c=x+b,
d=x+c,
If (x>10) { . . . }

Further, the one or more instances of use of the variable may be extracted from the statements in the source code using the external data source. For example, the one or more instances of use of a variable 'transaction-amt' may be, 'WRITE transaction-amt into transaction-file'. The external data source may be 'transaction-file'.

It may be understood that the identifying module 214 may identify the one or more instances of definition of each variable and the one or more instances of use of each variable by performing static analysis on the intermediate representation of the source code. The static analysis of the intermediate representation of the source code may link the one or more instances of definition of the variable to the one or more instances of use of the variable. For example, the intermediate representation of the source code may be represented as a directed graph. The one or more instances of the definition of the variable may be sources for directed edges in the directed graph. The directed edges may be directed towards the one or more instances of the use of the variable.

Similarly, the static analysis of the intermediate representation of the source code may link the one or more instances of use of the variable to the one or more instances of definition of the variable. For example, in the directed graph, the one or more instances of the use of the variable may be the sources for the directed edges. The directed edges may be directed towards the one or more instances of definition of the variable.

In order to explain implementation of the identifying module 214, consider the intermediate representation of the source code as,
int a=0=><def, variable: a, unique-id: 1>
int b=1=><def, variable: b, unique-id: 2>
int c; =><def, variable: c, unique-id: 3>
int d: =><def, variable: d, unique-id: 4>
c=a+b=><use, variable: a, unique-id: 5><use, variable: b, unique-id: 6><def, variable: c, unique-id: 7> (here 'c' is being defined using 'a' and 'b'. In other words, this statement is a definition point of 'c' and use point for 'a' and 'b')
d=a+b=><use, variable: a, unique-id: 8><use, variable: b, unique-id: 9><def, variable: d, unique-id: 10> (here 'd' is being defined using 'a' and 'b')

The static analysis performed on the intermediate representation of the source code may be represented as,
<def, variable: a, unique-id: 1>=><use, variable: a, unique-id: 5><use, variable: a, unique-id: 8>
<def, variable: b, unique-id: 2>=><use, variable: b, unique-id: 6><use, variable: a, unique-id: 9>
<def, variable: c, unique-id: 3>=>{ }
<def, variable: d, unique-id: 4>=>{ }
<def, variable: c, unique-id: 7>=>{ }
<def, variable: d, unique-id: 8>=>{ }

After employing the identifying module 214, the system 102 may employ the categorizing module 216. The categorizing module 216 may categorize the variable into a group of variables. The variable may be categorized into the group of variables based on the one or more instances of definition of the variable, the one or more instances of use of the variable, a description of the variable, and mathematical operators defining a correlation between one or more variables of the plurality of variables. The description of the variable indicates a nature of data stored in the variable. For example, the data stored in the variable may be an identifier, an amount, a name of a person, an address of the person, and the like. Therefore, the description of the variable may be customer id, account id, amount, amount of transaction, name of a person, and address of the person.

Further, the group of the variables may comprise variables storing data of similar nature. For example, consider that the plurality of variables present in the source code may be x, y, a, b, and c. The variable 'x' may store principal amount, 'y' may store amount, 'a' may store customer id, 'b' may store account id, and 'c' may store transaction id. The nature of the data stored in the variables x and y may be similar as both the variables store an integer or a decimal number. Therefore, the variables x and y may be categorized in a same group of the variables as the nature of the data stored in the variables x and y is similar.

The group of the variables may be further categorized based on the mathematical operators defining a correlation between the variable and one or more other variables of the plurality of variables. The mathematical operators may comprise an addition operator, an equal to operator, and a subtraction operator. For example, consider that the source code comprises statements:
x=10,
y=x+10,
z=x−5

Further, consider that the description of the variable x may be 'amount' and the description of the variable y may be 'amount of withdrawal.' Thus, the nature of the data stored in the variables x and y may be considered to be similar. Further, the variable y may be defined using the variable x. As the variable y and the variable x may be correlated using the addition operator, and the nature of the data stored in the variables x and y may be similar, the variables x and y may be categorized in the same group of variables.

Similarly, consider that the description of the variable z may be 'amount of deposit'. Thus, the nature of the data stored in the variables x, y and z may be considered to be similar. Further, the variables x and z may be correlated using the subtraction operator. Therefore, the variables x, y and z may be categorized in the same group of variable.

The system 102 may further employ the creating module 218. The creating module 218 may create a data description table of the plurality of variables. The data description table may comprise the variable and the description of the variable. The data description table may also comprise the unique identifier allocated to the variable. For example, Table 1 illustrates the data description table comprising the variable and the description of the variable.

TABLE 1

| Variable | Unique Identifier | Description of the variable |
| --- | --- | --- |
| x | 1 | amount |
| y | 2 | amount of withdrawal |
| a | 3 | amount of deposit |
| b | 4 | customer id |

The creating module 218 may further create a data dictionary of the plurality of variables. The data dictionary may comprise the group of variables and the description of the variables present in the group of variables. For example, Table 2 illustrates the data dictionary comprising the group of variables and description of each variable present in the group of the variables.

TABLE 2

| S No. | Group of variable | Description of the variable |
| --- | --- | --- |
| 1 | {x, y, z} | {amount, amount of withdrawal, amount of deposit} |
| 2 | {a, b, c} | {customer id, account id, transaction id} |
| 3 | {l, m, n} | {first name, middle name, last name} |

The creating module 218 may further create a refined data dictionary from the data dictionary. The refined data dictionary may be created by eliminating false positives for the variables present in the data dictionary. The false positives may comprise two or more descriptions for the variable. For example, the description of the variable x may be 'amount' and 'amount of withdrawal'. The creating module 218 may refine the data dictionary by allowing a user to select only one description of the variable.

After creating the data description table and the data dictionary, the system 102 may employ the assigning module 220 for assigning an annotation to the variable and the statement based on the data dictionary and the description of the variables. The statement present in the source code of the software application may be assigned the annotation based on the annotation for each variable present in the statement. For example, consider that the statement in the source code may be, x>y. The description of the variable 'x' and the description of the variable 'y' may be referred from the data description table. Further, based on the data dictionary the statement may be assigned the annotation, 'the amount is greater than the amount of withdrawal'. The annotation assigned to the statement may be displayed to the user when the user may hover a cursor over the statement.

The annotation assigned to the variables and the statements in the source code may be further used for deriving a relationship between the variables present in the source code. The relationship between the variables may be used for extracting business rules embedded in the source code. The business rules may be embedded in conditional statements present in the source code. The annotation assigned to the conditional statement in the natural language may enable the user to understand the business rules embedded. For example, the conditional statement comparing the variable with a constant value may be 'IF WS-SRC-BALANCE>0', or 'IF WS-AMOUNT>0'. The constant value '0' in the conditional statement 'IF WS-SRC-BALANCE>0', or 'IF WS-AMOUNT>0' may indicate the business rule, "Account balance is very low". The relationship between the plurality of variables may also be used to identify the flow of the data and modification in the data stored in the variables. Specifically, the annotation assigned to the variable may be used for identifying the flow of the data and the modification in the data.

Figure 3:
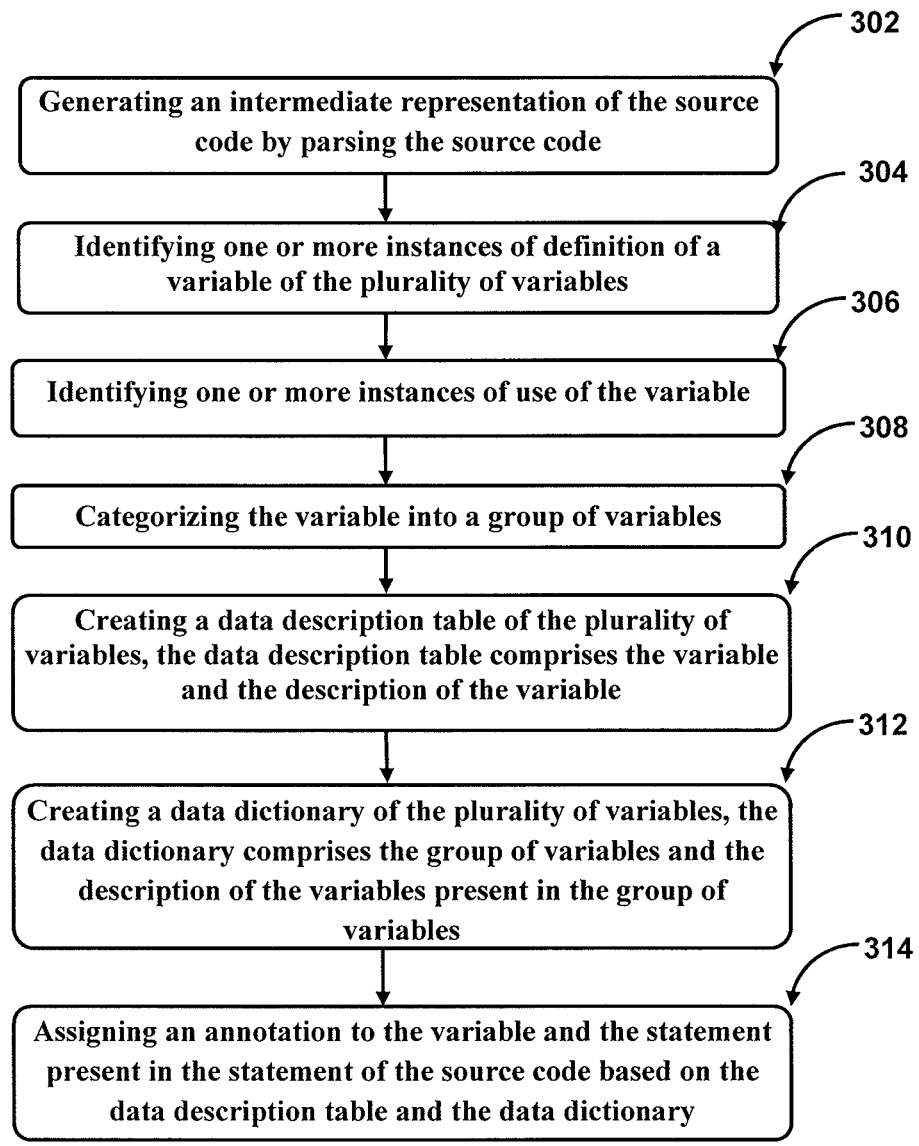
FIG. 3 shows a flowchart for illustrating a method for assigning an annotation to a variable and a statement in a source code of a software application, in accordance with an embodiment of the present subject matter.

Referring now to FIG. 3, a method for assigning an annotation to a variable and a statement in a source code of a software application is shown, in accordance with an embodiment of the present subject matter. The method may be described in the general context of computer executable instructions. Generally, computer executable instructions can include routines, programs, objects, components, data structures, procedures, modules, functions, etc., that perform particular functions or implement particular abstract data types. The method may also be practiced in a distributed computing environment where functions are performed by remote processing devices that are linked through a communications network. In a distributed computing environment, computer executable instructions may be located in both local and remote computer storage media, including, memory storage devices.

The order in which the method is described is not intended to be construed as a limitation, and any number of the described method blocks can be combined in any order to implement the method or alternate methods. Additionally, individual blocks may be deleted from the method without departing from the spirit and scope of the subject matter described herein. Furthermore, the method can be implemented in any suitable hardware, software, firmware, or combination thereof. However, for ease of explanation, in the embodiments described below, the method may be considered to be implemented in the above described system 102.

At block 302, an intermediate representation of the source code may be generated by parsing the source code. The source code comprises a plurality of variables. In one implementation, the intermediate representation of the source code may be generated by the generating module 212.

At block 304, one or more instances of definition of a variable of the plurality of variables present in the intermediate representation may be identified. In one implementation, the one or more instances of definition of the variable may be identified by the identifying module 214.

At block 306, one or more instances of use of the variable in the intermediate representation may be identified. In one implementation, the one or more instances of use of the variable in the intermediate representation may be identified by the identifying module 214.

At block 308, the variable may be categorized into a group of variables. The variable may be categorized into the group of variables based on the one or more instances of definition of the variable, the one or more instances of use of the variable, a description of the variable, and mathematical operators defining a correlation between the variable and one or more other variables of the plurality of variables. The description of the variable indicates a nature of data stored in the variable. The group of variables comprises variables storing data of similar nature. In one implementation, the variable may be categorized into a group of variables by the categorizing module 216.

At block 310, a data description table of the plurality of variables may be created. The data description table comprises the variable and the description of the variable. In one implementation, the data description table of the plurality of variables may be created by the creating module 218.

At block 312, a data dictionary of the plurality of variables may be created. The data dictionary comprises the group of variables and the description of the variables present in the group of variables. In one implementation, the data dictionary of the plurality of variables may be created by the creating module 218.

At block 314, an annotation may be assigned to the variable present in the statement of the source code based on the data description table and the data dictionary. In one implementation, the annotation may be assigned to the variable present in the statement by the assigning module 220.

Although implementations for methods and systems for assigning an annotation to a statement in a source code of a software application have been described in language specific to structural features and/or methods, it is to be understood that the appended claims are not necessarily limited to the specific features or methods described. Rather, the specific features and methods are disclosed as examples of implementations for assigning an annotation to a statement in a source code of a software application.

We claim:

1. A method for assigning an annotation to a variable and a statement in a source code of a software application, the method comprising:

generating, by a processor, an intermediate representation of the source code by parsing the source code, wherein the source code comprises a plurality of variables;

identifying one or more instances of definition of the variable of the plurality of variables present in the intermediate representation;

identifying, one or more instances of use of the variable in the intermediate representation;

categorizing, by the processor, the variable into a group of variables based on:
  a) the one or more instances of definition of the variable,
  b) the one or more instances of use of the variable,
  c) a description of the variable, and
  d) mathematical operators defining a correlation between the variable and one or more other variables of the plurality of variables,
  wherein the description of the variable indicates a nature of data stored in the variable, and wherein the group of variables comprises variables storing data of similar nature;

creating a data description table of the plurality of variables, wherein the data description table comprises the variable and the description of the variable;

creating, by the processor, a data dictionary of the plurality of variables, wherein the data dictionary comprises the group of variables and the description of the variables present in the group of variables; and assigning, by the processor, the annotation to the variable present in the statement of the source code based on the data description table and the data dictionary, thereby assigning the annotation to the statement in the source code of the software application.

2. The method of claim wherein the one or more instances of definition of the variable are linked to the one or more instances of use of the variable by performing static analysis on the intermediate representation of the source code.

3. The method of claim 1, wherein the one or more instances of use of the variable are linked to the one or more instances of definition of the variable by performing static analysis on the intermediate representation of the source code.

4. The method of claim wherein the identifying is performed by implementing static analysis on the intermediate representation of the source code.

5. The method of claim 1, wherein the description of the variable is obtained from an external data source or as a user input.

6. The method of claim 1, wherein the one or more instances of definition of the variable and the one or more instances of use of the variable are extracted from statements in the source code using an external data source.

7. The method of claim 1, further comprising, allocating a unique identifier to each variable of the plurality of variables.

8. The method of claim 1, further comprising creating a refined data dictionary from the data dictionary by eliminating false positives for the variables present in the data dictionary.

9. The method of claim 8, wherein the false positives comprises two or more descriptions for the variable.

10. The method of claim 1, wherein the annotation assigned to the variable and the statement in the source code is in a natural language.

11. The method of claim 1, wherein the annotation assigned to the variable and the statement in the source code defines a relation between the variables present in the statement.

12. A system for assigning an annotation to a variable and a statement in a source code of a software application, the system comprising:
  a processor; and
  a memory coupled to the processor, wherein the processor is capable of executing a plurality of modules stored in the memory, and wherein the plurality of modules comprising:
    a generating module to generate an intermediate representation of the source code by parsing the source code, wherein the source code comprises a plurality of variables;
    an identifying module to identify:
      one or more instances of definition of the variable of the plurality of variables present in the intermediate representation, and
      one or more instances of use of the variable in the intermediate representation;
    a categorizing module to categorize the variable into a group of variables based on:
    a) the one or more instances of definition of the variable,
    b) the one or more instances of use of the variable,
    c) a description of the variable, and
    d) mathematical operators defining a correlation between the variable and one or more other variables of the plurality of variables,
    wherein the description of the variable indicates a nature of data stored in the variable, and wherein the group of variables comprises variables storing data of similar nature;
    a creating module to create:
      a data description table of the plurality of variables, wherein the data description table comprises the variable and the description of the variable;
      a data dictionary of the plurality of variables, wherein the data dictionary comprises the group of variables and the description of the variables present in the group of variables; and
    an assigning module to assign the annotation to the variable present in the statement of the source code based on the data description table and the data dictionary, thereby assigning the annotation to the statement in the source code of the software application.

13. The system of claim 12, wherein the one or more instances of definition of the variable are linked to the one or more instances of use of the variable by performing static analysis on the intermediate representation of the source code.

14. The system of claim 12, wherein the one or more instances of use of the variable are linked to the one or more instances of definition of the variable by performing static analysis on the intermediate representation of the source code.

15. The system of claim 12, wherein the identifying module further implements static analysis on the intermediate representation of the source code to identify the one or more instances of definition of the variable and one or more instances of use of the variable.

16. The system of claim 12, wherein the description of the variable is obtained from an external data source or as a user input.

17. The system of claim 12, wherein the one or more instances of definition of the variable and the one or more instances of use of the variable are extracted from statements in the source code using an external data source.

18. The system of claim 12, wherein the system further comprising an allocating, module to allocate a unique identifier to each variable of the plurality of variables.

19. The system of claim 12, wherein the creating module further creates a refined data dictionary from the data dictionary by eliminating false positives for the variables present in the data dictionary.

20. A non-transitory computer readable medium embodying a program executable in a computing device for assigning an annotation to a variable and a statement in a source code of a software application, the program comprising:

a program code for generating an intermediate representation of the source code by parsing the source code, wherein the source code comprises a plurality of variables;

a program code for identifying one or more instances of definition of ache variable of the plurality of variables present in the intermediate representation;

a program code for identifying one or more instances of use of the variable in the intermediate representation;

a program code for categorizing the variable into a group of variables based on:

a) the one or more instances of definition of the variable, h) the one or more instances of use of the variable, c) a description of the variable, and (d) mathematical operators defining a correlation between the variable and one or more other variables of the plurality of variables, wherein the description of the variable indicates a nature of data stored in the variable, and wherein the group of variables comprises variables storing data of similar nature;

a program code for creating a data description table of the plurality of variables, wherein the data description table comprises the variable and the description of the variable;

a program code for creatingcreate a data dictionary of the plurality of variables, wherein the data dictionary comprises the group of variables and the description of the variables present in the group of variables; and a program code for assigning the annotation to the variable present in the statement of the source code based on the data description table and the data dictionary, thereby assigning the annotation to the statement in the source code of the software application.

* * * * *

UNITED STATES PATENT AND TRADEMARK OFFICE
CERTIFICATE OF CORRECTION

PATENT NO. : 9,652,227 B2
APPLICATION NO. : 14/726326
DATED : May 16, 2017
INVENTOR(S) : Pavan Kumar Chittimalli It is certified that error appears in the above-identified patent and that said Letters Patent is hereby corrected as shown below:

In the Specification

In Column 9 at Lines 57-58, Delete "instructions may be located in both local and remote computer storage media, including, memory storage devices." and insert the same on Column 9, Line 56, as a continuation of the same paragraph.

In the Claims

In Column 11 at Line 1, In Claim 1, change "identifying," to --identifying--.

In Column 11 at Line 29, In Claim 2, change "claim" to --claim 1,--.

In Column 11 at Line 38, In Claim 4, change "claim" to --claim 1,--.

In Column 11 at Line 48, In Claim 7, change "comprising," to --comprising--.

In Column 12 at Line 64, In Claim 18, change "allocating," to --allocating--.

In Column 13 at Line 12 (approx.), In Claim 20, change "ache" to --the--.

In Column 13 at Line 19 (approx.), In Claim 20, change "h)" to --b)--.

In Column 14 at Line 1, In Claim 20, change "(d)" to --d)--.

In Column 14 at Line 12 (approx.), In Claim 20, change "creatingcreate" to --creating--.

Signed and Sealed this
Thirty-first Day of July, 2018

Andrei Iancu
*Director of the United States Patent and Trademark Office*